(12) United States Patent
Manssour

(10) Patent No.: US 9,326,151 B2
(45) Date of Patent: Apr. 26, 2016

(54) METHODS AND ARRANGEMENTS FOR A COORDINATION OF FREQUENCY BAND SELECTIONS FOR INTERFERING UPLINK TRANSMISSIONS IN A CELLULAR NETWORK

(75) Inventor: Jawad Manssour, Seoul (KR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/232,386

(22) PCT Filed: Jul. 21, 2011

(86) PCT No.: PCT/SE2011/050960
§ 371 (c)(1),
(2), (4) Date: Jan. 13, 2014

(87) PCT Pub. No.: WO2013/012363
PCT Pub. Date: Jan. 24, 2013

(65) Prior Publication Data
US 2014/0235255 A1 Aug. 21, 2014

(51) Int. Cl.
*H04W 40/00* (2009.01)
*H04W 16/10* (2009.01)

(52) U.S. Cl.
CPC ..................................... *H04W 16/10* (2013.01)

(58) Field of Classification Search
CPC ............ H04W 72/082; H04W 52/243; H04W 52/241; H04W 52/244; H04W 16/10
USPC ................. 455/502, 447, 452.2, 522; 370/344
See application file for complete search history.

(56) References Cited

U.S. PATENT DOCUMENTS

| | | | | |
|---|---|---|---|---|
| 5,722,043 | A | * | 2/1998 | Rappaport et al. .......... 455/452.1 |
| 7,151,795 | B1 | * | 12/2006 | Goldburg .............. H04W 52/34 375/227 |
| 2008/0057996 | A1 | * | 3/2008 | Sung et al. ..................... 455/522 |
| 2008/0247375 | A1 | * | 10/2008 | Muharemovic et al. ...... 370/344 |
| 2009/0233544 | A1 | * | 9/2009 | Oyman et al. ..... H04B 7/15592 455/7 |
| 2009/0323603 | A1 | | 12/2009 | Kwon et al. |

(Continued)

FOREIGN PATENT DOCUMENTS

EP 2214432 A1 8/2010

OTHER PUBLICATIONS

Kimura, et al. De-Centralized Dynamic ICIC Using X2 Interfaces for Downlink LTE Systems. Vehicular Technology Conference (VTC Spring), 2011 IEEE 73$^{rd}$. May 15-18, 2011.

(Continued)

*Primary Examiner* — Mong-Thuy Tran

(57) ABSTRACT

A method in a base station for assisting in a coordination of frequency band selections for interfering uplink transmissions in a cellular network. The base station selects a first frequency band and a second frequency band. The first frequency band is to be used in the first cell for uplink transmissions from which an estimated interference in a second cell exceeds a first threshold. The second frequency band is to be used in the first cell for uplink transmissions from which an estimated interference in a third cell exceeds a second threshold. The base station informs a serving base station of the second cell and a serving base station of the third cell about the selection, thereby assisting these base stations in coordinating their respective frequency band selection with that of the base station.

8 Claims, 6 Drawing Sheets

(56) References Cited

U.S. PATENT DOCUMENTS

| | | | |
|---|---|---|---|
| 2010/0093363 A1* | 4/2010 | Malladi | 455/452.2 |
| 2010/0177654 A1* | 7/2010 | Charbit et al. | 370/252 |
| 2010/0261482 A1* | 10/2010 | Guey | 455/452.2 |
| 2010/0279700 A1 | 11/2010 | Kim et al. | |
| 2010/0309866 A1* | 12/2010 | Katayama et al. | 370/329 |
| 2011/0070911 A1* | 3/2011 | Zhang et al. | H04W 16/02 455/509 |
| 2012/0082038 A1* | 4/2012 | Xu et al. | 370/244 |
| 2012/0244871 A1 | 9/2012 | Zhao | |

OTHER PUBLICATIONS

Chen, et al. Enhanced Fractional Frequency Reuse for Large-Scale OFDMA Networks with Heterogeneous Cell Layout: Optimization and Performance Evaluation. Communication Systems (ICCS), 2010 International Conference on, Nov. 17-19, 2010.

Xiangning, et al. An Inter-Cell Interference Coordination Technique Based on Users' Ratio and Multi-Level Frequency Allocations. Wireless Communications, Networking and Mobile Computing, 2007. Sep. 21-25, 2007.

Ellenbeck, J. et al. Performance of Decentralized Interference Coordination in the LTE Uplink. Vehicular Technology Conference (VTC 2009-Fall). Sep. 20-23, 2009.

Texas Instruments: "Inter-Cell Interference Mitigation for EUTRA," 3GPP draft; R1-051059; 3rd Generation Partnership Project; vol. RAN WG1, San Diego, CA, USA; Oct. 4, 2005.

Xunyong Zhang, et al.: "Inter-cell interference coordination based on softer frequency reuse in OFDMA cellular systems," Neural Networks and Signal Processing, 2008 International Conference, IEEE, Piscataway, NJ, USA, Jun. 8, 2008.

* cited by examiner

Tx PSD cell 1    Tx PSD cell 2    Tx PSD cell 3

METHODS AND ARRANGEMENTS FOR A COORDINATION OF FREQUENCY BAND SELECTIONS FOR INTERFERING UPLINK TRANSMISSIONS IN A CELLULAR NETWORK

TECHNICAL FIELD

Embodiments herein relate to a base station and a method in a base station. In particular, embodiments herein relate to coordination of frequency band selections for interfering uplink transmissions in a cellular network.

BACKGROUND

In a typical cellular network, also referred to as a wireless communication system, User Equipments (UEs), communicate via a Radio Access Network (RAN) to one or more core networks (CNs).

A user equipment is a mobile terminal by which a subscriber can access services offered by an operator's core network. The user equipments may be for example communication devices such as mobile telephones, cellular telephones, laptops or tablet computers, sometimes referred to as surf plates, with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly in the cellular network. The communication may be performed e.g. between two user equipments, between a user equipment and a regular telephone and/or between the user equipment and a server via the radio access network and possibly one or more core networks, comprised within the cellular network.

The cellular network covers a geographical area which is divided into cell areas. Each cell area is served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also on cell size.

A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some radio access networks, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or eNBs, may be directly connected to one or more core networks.

UMTS is a third generation, 3G, mobile communication system, which evolved from the second generation, 2G, mobile communication system GSM, and is intended to provide improved mobile communication services based on Wideband Code Division Multiple Access (WCDMA) access technology. UMTS Terrestrial Radio Access Network (UT-RAN) is essentially a radio access network using wideband code division multiple access for user equipments. The 3GPP has undertaken to evolve further the UTRAN and GSM based radio access network technologies.

In the context of this disclosure, a base station as described above will be referred to as a base station or a Radio Base Station (RBS). A user equipment as described above, will in this disclosure be referred to as a user equipment or a UE.

The expression DownLink (DL) will be used for the transmission path from the base station to the user equipment. The expression UpLink (UL) will be used for the transmission path in the opposite direction i.e. from the user equipment to the base station.

Cellular communication networks evolve towards higher data rates, together with improved capacity and coverage. In 3GPP, standardization body technologies like GSM, HSPA and LTE have been and are currently developed.

LTE uses a radio access technology based on Orthogonal Frequency Division Multiplexing (OFDM) for downlink transmissions and based on Single Carrier Frequency Division Multiple Access (SC-FDMA) for uplink transmissions. The resource allocation to user equipments on both downlink and uplink may be performed adaptively by the concept of so called fast scheduling, taking into account the instantaneous traffic pattern and radio propagation characteristics of each user equipment. Assigning resources in both downlink and uplink may be performed in a scheduler situated in a base station, which base station is in LTE referred to as an eNodeB.

A problem is that it may be difficult for the base station to schedule the transmissions to obtain satisfactory quality of service in the cellular network. For example, one challenge for the scheduler is to maximize the throughput for the user equipments experiencing the worst channel quality and at the same time achieve a high total throughput.

As cellular systems typically operate on a specific limited bandwidth due to for example cost of licenses, manufacturing, etc. it is therefore highly desirable to utilize the spectrum as efficiently as possible. This has mainly led to the introduction of the so called reuse-1 in the most modern cellular systems such as e.g. LTE, and Worldwide Interoperability for Microwave Access (WiMax). A reuse-1 means that all of the available licensed spectrum is reused in all cells in the system, and is performed in order to increase the system's capacity. However, a reuse-1 would inevitably lead to a very high interference for cell-edge users, mainly in the uplink due to power limitation of the user equipments.

Several approaches have been proposed to alleviate this limitation. One general approach is reuse partitioning, wherein a reuse-1 is utilized for cell-center user equipments, as they are not so susceptible to inter-cell interference, and a so called reuse-3 is utilized for cell-edge user equipments. Reuse-3 means that the reuse distance is equal to 3 i.e. the same frequency resources are reused every third cell.

In reuse partitioning, the spectrum, that is the frequency resources, is explicitly divided into two parts: cell-center spectrum which consists of the same resources for all cells, and cell-edge spectrum. The cell-center spectrum is allocated to cell-center users in all cells with a reuse-1 fashion. The cell-edge spectrum is allocated to cell-edge users in a reuse-3 fashion.

In so called Soft Frequency Reuse (SFR), the reuse-3 of cell edge users is obtained in a 'soft' fashion, i.e. by letting it overlap with the cell-center spectrum of the other cells. The reasoning behind such an approach is that cell-center users are rather immune to inter-cell interference so they would not be affected by being scheduled on the same resources as cell-edge users in neighboring cells, and that the cell-center users will not generate high interference to the cell-edge users either.

A problem is however, that such reuse partitioning schemes have limitations since they result in unutilized parts of the spectrum and too little allocation for cell-edge users. Therefore, such reuse partitioning schemes are not very useful to balance between good cell capacity and cell-edge user throughput in the cellular network.

SUMMARY

In view of the discussion above, it is an object for embodiments herein to provide an improved way of coordinating frequency band selections for interfering uplink transmissions in a cellular network.

According to a first aspect, the object is achieved by a method in a base station for assisting in a coordination of frequency band selections for interfering uplink transmissions in a cellular network. The base station serves a first cell in the cellular network. The cellular network further comprises a second cell and a third cell. The base station selects a first frequency band and a second frequency band. The first frequency band is to be used in the first cell for uplink transmissions from which uplink transmissions an estimated interference in the second cell exceeds a first threshold. The second frequency band is to be used in the first cell for uplink transmissions from which uplink transmissions an estimated interference in the third cell exceeds a second threshold. The base station informs a serving base station of the second cell and a serving base station of the third cell about the performed selection, thereby assisting the serving base station of the second cell and the serving base station of the third cell in coordinating their respective frequency band selection with that of the base station.

According to a second aspect, the object is achieved by a base station for assisting in a coordination of frequency band selections for interfering uplink transmissions in a cellular network. The base station serves a first cell in the cellular network. The cellular network further comprises a second cell and a third cell. The base station comprises a selecting unit configured to select a first frequency band and a second frequency band. The first frequency band is to be used in the first cell for uplink transmissions from which uplink transmissions an estimated interference in the second cell exceeds a first threshold. The second frequency band is to be used in the first cell for uplink transmissions from which uplink transmissions an estimated interference in the third cell exceeds a second threshold. The base station further comprises an informing unit configured to inform a serving base station of the second cell and a serving base station of the third cell about the performed selection, thereby assisting the serving base station of the second cell and the serving base station of the third cell in coordinating their respective frequency band selection with that of the base station.

By selecting two different frequency bands, one for uplink transmissions which will interfere mainly with the second cell, and one for uplink transmissions which will interfere mainly with the third cell, and informing the respective serving base station of the second cell and the third cell about the selected frequency bands, the coordination of frequency bands for interfering uplink transmissions between different cells is facilitated due to a smaller needed coordination bandwidth and the possibility to coordinate with one cell at a time.

This provides an improved way of handling coordination of frequency band selections for interfering uplink transmissions in the cellular network.

DETAILED DESCRIPTION

Figure 1:
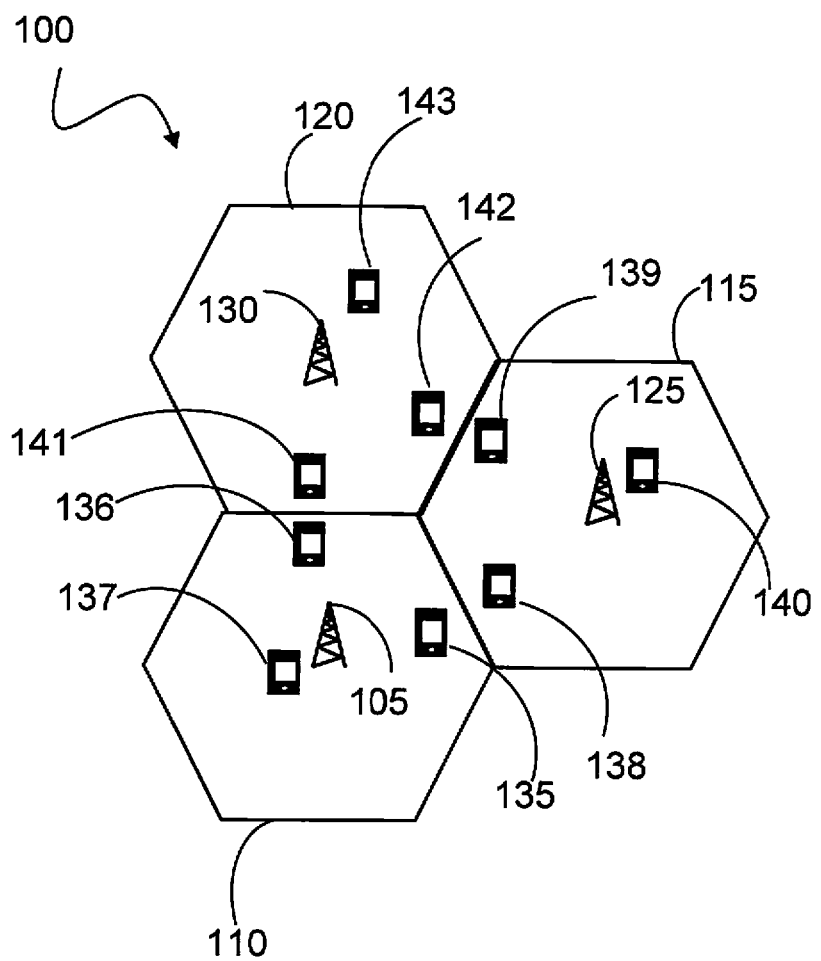
FIG. 1 is a schematic block diagram illustrating an embodiment of a cellular network.

FIG. 1 depicts a cellular network 100. The cellular network 100 may be an LTE cellular network, a WiMAX cellular network, or any other cellular network with frequency-domain scheduling or multiplexing.

The cellular network 100 comprises a base station 105 serving a first cell 110. The cellular network 100 further comprises a second cell 115 and a third cell 120. The second cell 115 and the third cell 120 may be served by the base station 105 or have another serving base station. In the example in FIG. 1, the serving base station of the second cell is a base station 125, and the serving base station of the third cell 120 is a base station 130, which may or may not be the same as the base station 105.

The base stations 105, 125, 130 in this example are eNBs, but may in other embodiments be referred to by different names such as for example RBS, eNodeB, NodeB, B node, or BTS, depending on the technology and terminology used. The base stations 105, 125 and 130 may in some embodiments be of different classes such as e.g. macro eNodeB, home eNodeB or pico base station.

Three user equipments are located in the first cell 110 and served by the base station 105: a user equipment 135, a user equipment 136 and a user equipment 137. The user equipments 135 and 136 are located at the edge of the cell 110, and may hence be referred to as cell-edge user equipments. The user equipment 137 is located nearer the center of the first cell 110, closer to the serving base station 105. The user equipment 137 may hence be referred to as a cell-center user equipment.

The second cell 115 also serves three user equipments in this example: a cell-edge user equipment 138, a cell-edge user equipment 139, and a cell-center user equipment 140.

Similarly, the third cell 115 also serves three user equipments: a cell-edge user equipment 141, a cell-edge user equipment 142, and a cell-center user equipment 143.

The user equipments 135-143 may be for example communication devices such as mobile telephones, cellular telephones, laptops, or tablet computers, sometimes referred to as surf plates, with wireless capability. The user equipments may be portable, pocket-storable, hand-held, computer-comprised, or vehicle-mounted mobile devices, enabled to communicate voice and/or data, via the radio access network, with another entity, such as another mobile station or a server.

It is to be understood that FIG. 1 is merely an example of the cellular network 100, and that the cellular network 100 may in reality comprise several further nodes, base stations and user equipments which are not illustrated in the FIG. 1.

As part of the development towards embodiments herein, a problem with common Soft Frequency Reuse (SFR) will first be identified and discussed below, with reference to FIG. 1 and FIG. 2.

Figure 2:
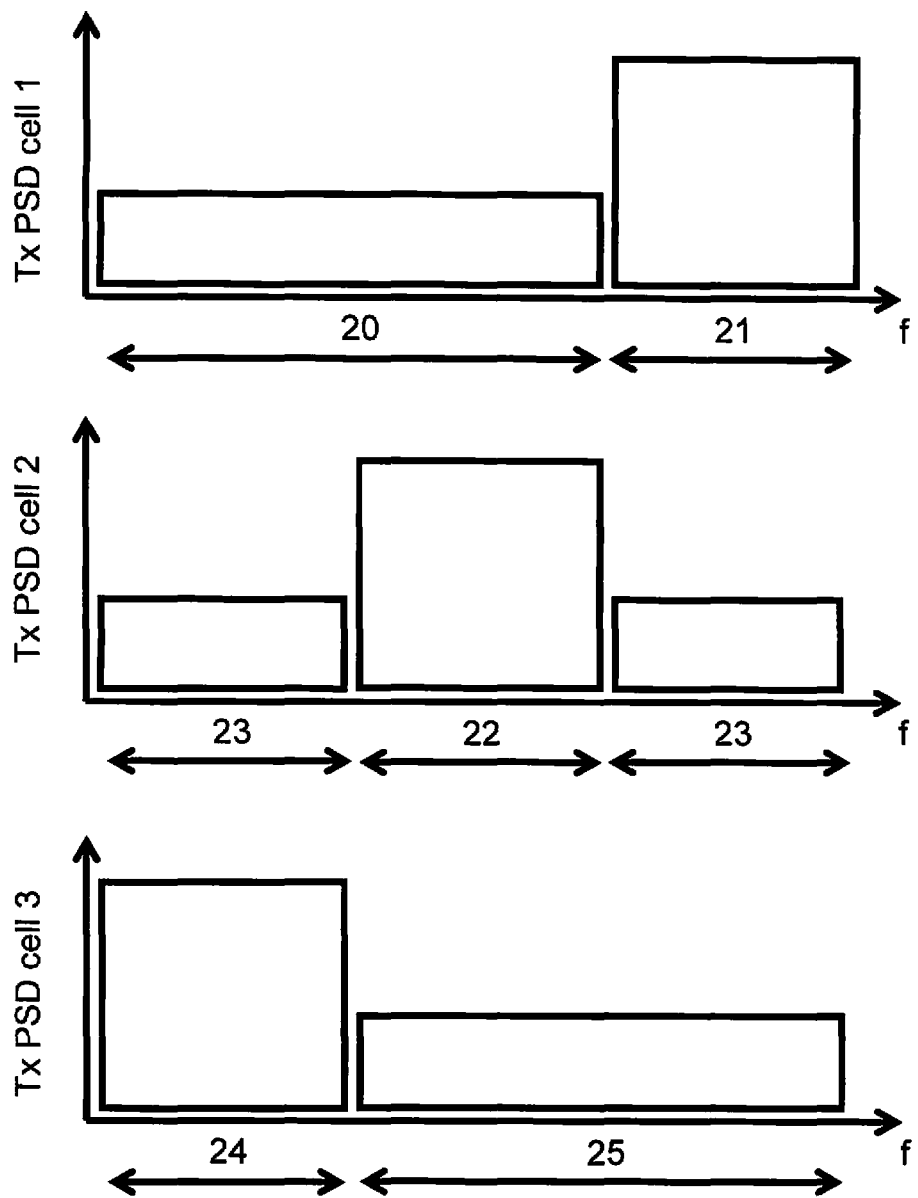
FIG. 2 is a schematic illustration of frequency band coordination according to prior art.

FIG. 2 illustrates a SFR scheme according to prior art. For the sake of clarity, cells and user equipments depicted in FIG. 1 will be referred to in the following discussion. In the diagrams, the longitudinal axis is Transmit Power Spectral Density, TxPSD. The horizontal axis is frequency, f. In the FIG. 2, the frequency bands corresponding to the higher Tx PSD are cell-edge frequency bands, and the frequency bands corresponding to the lower Tx PSD are the cell-center frequency bands. The reason for this is that cell-edge user equipments will likely use a higher transmit power than cell-center user equipments.

In the prior art example of FIG. 2, the first cell 110 has a cell-center band 20. This is where uplink transmissions from cell-center user equipments, e.g. the user equipment 137, would be scheduled in the first cell 110, and single cell-edge band 21 on which it will schedule all uplink transmissions from its cell-edge user equipments, that is, the cell-edge user equipments 135 and 136 in the FIG. 1.

The second cell 115 similarly has a single cell-edge band 22 and the third cell 120 has a single cell-edge band 24, where they will schedule uplink transmissions from their respective cell edge user equipments. The respective cell-edge bands 21, 22, 23 are selected not to coincide, to avoid that cell-edge uplink transmissions in the first cell 110, the second cell 115, and the third cell 120 interfere with each other.

A cell-center band 23 of the second cell 115, a cell-center band 25 of the third cell 120 and the cell-center band 20 of the first cell 110 do however overlap with the respective cell edge bands of the respective other cells.

A problem with the SFR scheme described above is that even if it makes use of the fact that cell-center user equipments in one cell are not very susceptible to interference from other cells, and may hence be co-scheduled with cell-edge users from other cells, such SFR schemes still suffer from an important limitation which essentially limits the amount of resources that can be allocated to cell-edge user equipments. This is due to the fact that the coordination between the different cells is done based on the fact that each cell will have its single cell-edge band not overlapping with a neighbor's cell-edge band to avoid high inter-cell interference.

As such, the prior art approach is based on the fact that a cell will inform the neighbor cells it is coordinating its frequency band selections with where it will allocate its single cell-edge frequency band, and the neighbor cells will have to try to avoid this whole single cell-edge band region when allocating their own cell-edge bands.

This leads to putting unnecessary constraints on every neighbor cell when it comes to choosing its cell-edge band. These constraints lead to difficulties in coordinating frequency band selections between different cells, and to a decrease in the amount of resources that may be allocated for cell-edge user equipments.

Embodiments herein are based on the understanding that uplink transmissions from different user equipments located at different locations of the cell edge of a cell in question interfere with some cells more than others, and may hence not cause harmful interference to more than one, or a few, other cells.

How this is used to enable improved coordination of frequency band selections for interfering uplink transmissions in the cellular network 100 according to embodiments herein will be explained in the following.

In the following examples, it will further be illustrated how embodiments herein allow for scheduling more cell-edge users per cell compared to prior art methods while still avoiding co-scheduling cell-edge user equipments that interfere with each other.

Figure 3:
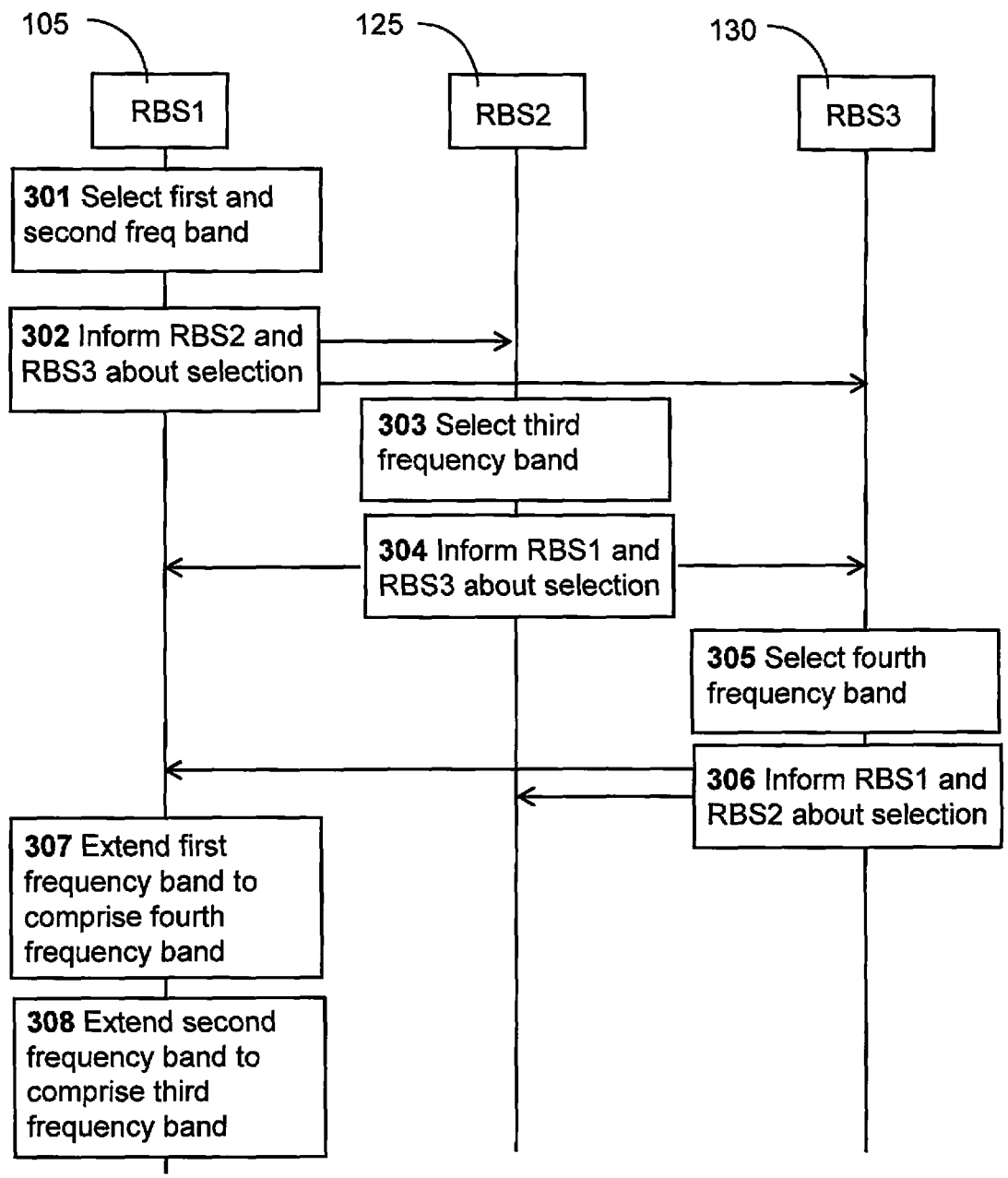
FIG. 3 is a combined signalling scheme and flowchart illustrating embodiments in a cellular network.

FIG. 3 illustrates a method in the cellular network 100 for handling a coordination of frequency band selections for interfering uplink transmissions according to some embodiments herein. The method comprises the following actions, which may in other embodiments be taken in another suitable order. Reference will here too also be made to FIG. 1.

In action 301, the base station 105 selects two different cell-edge frequency bands: a first frequency band and a second frequency band.

The first frequency band is to be used in the first cell 110 for uplink transmissions from the cell edge user equipments which will interfere with the second cell 115. That is, in this example, the first selected frequency band is to be used for uplink transmissions to be performed by the cell-edge user equipment 135, since these uplink transmissions are expected to particularly interfere with the second cell 115.

The second frequency band is to be used in the first cell for uplink transmissions from the cell edge user equipments which will interfere particularly with the third cell 120. In this example, the second selected frequency band would be used for uplink transmissions to be performed by the cell-edge user equipment 136, since these uplink transmissions would particularly interfere with the second cell 120.

To determine which cells a particular user equipment 135, 136, 137 will interfere with, for example A3 measurement reports sent from the user equipments 135, 136, 137 to their serving base station 105 may be used.

In action 302, the base station 105 informs the serving base station of the second cell 115 and the serving base station of the third cell 120 about the frequency bands it has selected. In FIG. 3, the serving base station 125 of the second cell 115 is denoted RBS2, and the serving base station 130 of the third cell is denoted RBS3. It is, as previously mentioned, to be understood that the serving base stations of the second cell 115 and/or the third cell 120 may in some embodiments be the base station 105 itself.

In action 303, the serving base station 125 of the second cell 115 selects a third frequency band. The third frequency band is to be used in the second cell 115 for uplink transmissions from the cell edge user equipments which will interfere with the third cell 120. In the example illustrated in FIG. 1, the third frequency band would hence be used for uplink transmissions to be performed by the cell-edge user equipment 138, since these uplink transmissions would particularly interfere with the third cell 120.

The serving base station 125 of the second cell 115 may also in this action select a further frequency band to be used in the second cell 115 for uplink transmissions from the cell edge user equipments which are expected to interfere with the first cell 110, such as for example the cell-edge user equipment 138.

In action 304, the base serving base station 125 of the second cell 115 informs the base station 105 and the serving base station 130 of the third cell 120 about its selection performed in action 303.

In action 305, the serving base station 130 of the third cell 120 selects a fourth frequency band. The fourth frequency band is to be used in the third cell 120 for uplink transmissions from the cell edge user equipments which will interfere with the second cell 115. In the example illustrated in FIG. 1, the fourth frequency band would hence be used for uplink transmissions to be performed by the cell-edge user equipment 140, since these uplink transmissions would particularly interfere with the second cell 115.

The serving base station 130 of the third cell 120 may also in this action select a further frequency band to be used in the third cell 120 for uplink transmissions from the cell edge user equipments which are expected to interfere with the first cell 110, such as for example the cell-edge user equipment 141.

In action 306, the base serving base station 130 of the third cell 120 informs the base station 105 and the serving base station 125 of the second cell 115 about its selection performed in action 304.

In action 307, the base station 105 extends its selected first frequency band by selecting a first frequency band that further comprises the fourth frequency band.

In action 308, the base station 105 extends its selected second frequency band by selecting a second frequency band that further comprises the third frequency band.

Thanks to the action 201 wherein the base station 105 selects the two different frequency bands for different uplink transmissions to be performed in the first cell 110, i.e. uplink transmissions to be performed by different cell-edge user equipments in the first cell 110, depending on which cell the uplink transmission in question will interfere with, and action 202 wherein the base station 105 informs the respective serving base station of the second cell 115 and the third cell 120 of its selection, an improved coordination of frequency band selections is achieved.

This is because the second cell 115 will, when performing its one frequency band selection in action 303, only have to avoid only the first frequency band where it will be interfered with, not the whole cell-edge band of the first cell 110. Similarly, the third cell 120 needs, when performing its one frequency band selection in action 304, only to avoid the second frequency band where it will be interfered with, and not the whole cell-edge band of the first cell 110.

Hence, according to embodiments herein, it is possible to schedule cell-edge user equipments in one coordinating cell at the same part of the spectrum as uplink transmissions from cell-edge user equipments in another coordinating, or neighbour, cell that they do not harmfully interfere with.

Moreover, thanks to the extension of the selected first and second frequency bands performed in optional actions 307 and 308, the base station 105 can if necessary obtain more frequency resources where it can schedule uplink transmissions from its cell-edge user equipments.

Figure 4:
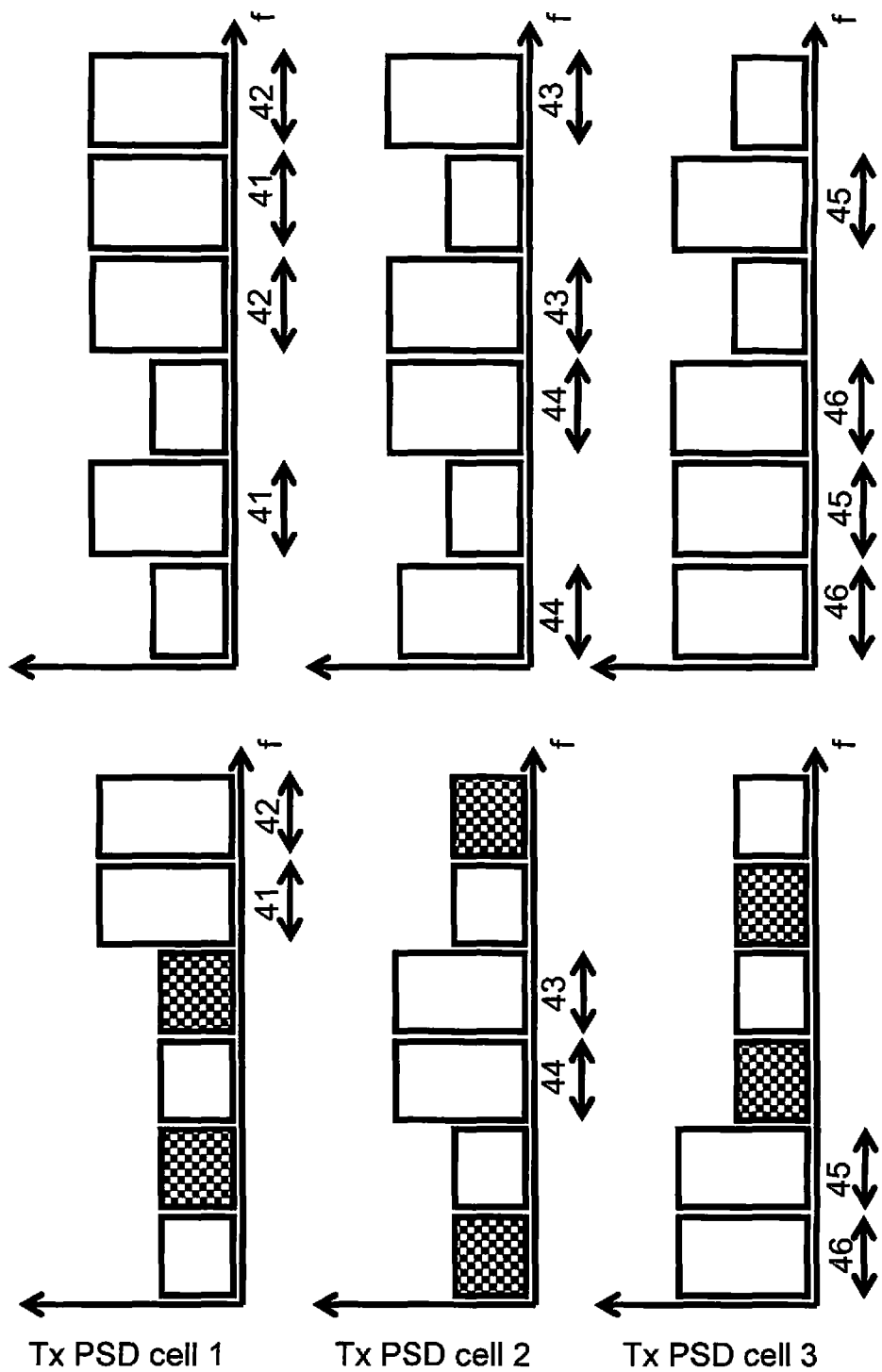
FIG. 4 is a schematic illustration of embodiments of coordination of frequency band selections.

How different frequency bands may be selected and coordinated in the cellular network 100 according to some embodiments herein will now be described with reference to FIG. 4. The left diagrams in FIG. 4 illustrate how each one of the respective first cell 110, top diagram, second cell 115, middle diagram, and third cell 120, bottom diagram, has selected two separate cell-edge frequency bands, one for each one of the other coordinating cells, according to some embodiments herein. In the diagrams, the longitudinal axis is Transmit Power Spectral Density, TxPSD. The horizontal axis is frequency, f. In the FIG. 4 too, the frequency bands corresponding to the higher Tx PSD are cell-edge frequency bands, and the frequency bands corresponding to the lower Tx PSD are the cell-center frequency bands. The reason for this is that cell-edge user equipments will likely use a higher transmit power than cell-center user equipments.

For the first cell 110, a first frequency band 41 has been selected, which will be used for uplink transmissions interfering particularly with the second cell 115, e.g. such uplink transmissions which are expected to cause an interference over a certain threshold in the second cell 115. This may be for example uplink transmissions from the user equipment 135 in FIG. 1.

For the first cell 110 a second frequency band 42 has also been selected. The second frequency band 42 will be used for uplink transmissions interfering particularly with the third cell 120, e.g. such uplink transmissions which are expected to cause an interference over a certain threshold in the third cell 115. This may be for example uplink transmissions from the user equipment 136 in FIG. 1.

For the second cell 115, a third frequency band 43 has been selected, which will be used for uplink transmissions interfering particularly with the third cell 120, e.g. such uplink transmissions which are expected to cause an interference over a certain threshold in the third cell 115. This may be for example uplink transmissions from the user equipment 139 in FIG. 1.

Also for the second cell 115 a further frequency band 44 has been selected. The further frequency band 44 will be used for uplink transmissions interfering particularly with the first cell 110, e.g. such uplink transmissions which are expected to cause an interference over a certain threshold in the first cell 110. This may be for example uplink transmissions from the user equipment 138 in FIG. 1.

For the third cell 120, a fourth frequency band 45 has been selected which will be used for uplink transmissions interfering particularly with the second cell 115, e.g. such uplink transmissions which are expected to cause an interference over a certain threshold in the second cell 115. This may be for example uplink transmissions from the user equipment 142 in FIG. 1.

Also for the third cell 120 a further frequency band 46 has been selected. The further frequency band 46 will be used for uplink transmissions interfering particularly with the first cell 110, e.g. such uplink transmissions which are expected to cause interference over a certain threshold in the first cell 110. This may be for example uplink transmissions from the user equipment 141 in FIG. 1.

The selected frequency bands 41-16 are cell-edge frequency bands. Respective cell center bands of the first, second and third cell 110, 115, 120 are also shown in the FIG. 4. The cell-center frequency bands are to be used in the respective cell for uplink transmissions from cell-center user equipments, such as the user equipments 137, 140 and 143 in FIG. 1. The cell-center frequency bands are as previously mentioned the frequency bands which correspond to the lower TxPSD in the FIG. 4.

The top right diagram in FIG. 4 illustrates how the first cell 110 may extend its cell-edge frequency bands 41, 42 according to some embodiments herein. This may be performed for example to increase the amount of resources that could be allocated to cell-edge user equipments, without having the user equipments that interfere with each other scheduled on the same frequency resources in different cells, when many cell edge user equipments are present in the first cell 110.

The extending may be performed as described above in relation to FIG. 3, by adding the third frequency band 43 to the second frequency band 42, and the fourth frequency band 45 to the first frequency band 41. The result of such an extension is shown in the top right diagram.

According to some embodiments, the base station 105 serving the first cell 110 may perform the extension by checking which parts of its cell-center band coincide with frequency bands where its cell-edge user equipments will not be highly interfered with.

The parts of the respective cell-center bands of each cell which are illustrated with checkered blocks in the diagrams in FIG. 4 are the parts of the cell-center bands where cell-edge user equipments of the cell in question will not be highly interfered by cell edge user equipments in the other coordinating cells.

On these checkered blocks, the serving base station of the respective cell may hence extend one or more of its cell-edge frequency bands, on which it will schedule uplink transmissions from its cell-edge user equipments, without having them collide with harmful uplink transmissions from cell-edge user equipments in the other two coordinating cells.

However, when selecting and/or extending cell-edge frequency bands according to embodiments herein, the respective cell-edge frequency band selected by two coordinating cells that do not interfere with each other in the uplink on that specific frequency band should be selected and/or extended on the same resources as the cell-center band of the third cell.

Looking at the example in FIG. 4, this means that the third cell 120 and the second cell 115 may select their respective frequency bands 44, 46, on which to schedule their cell-edge user equipments that interfere harmfully with the first cell 110, on the same frequency resources as the cell center band of the first cell 110.

Similarly, the third cell 120 and first cell 110 may only select their respective frequency bands 45, 41, on which they will schedule uplink transmissions from their cell-edge user equipments that interfere with the second cell 115, on the cell-center band of the second cell 115. This is desirable in the sense that the cell-center user equipments can tolerate being scheduled on the same band as cell-edge users from more than one neighboring cell.

The middle diagram to the right in FIG. 4 illustrate how the second cell 115 may also extend its selected frequency bands 43 and 44 to allocate more resources to its cell-edge users according to some embodiments herein, by selecting the frequency band 43 to further comprise the frequency band 42, and by selecting the frequency band 44 to further comprise the frequency band 46.

The bottom diagram to the right in FIG. 4 illustrate how the third cell 120 may also extend its selected frequency bands 45 and 46 to allocate more resources to its cell-edge users according to some embodiments herein, by adding the frequency band 41 to its selected frequency band 45, and the frequency band 44 to its selected frequency band 46.

According to some embodiments herein, each of the cells 110, 115 and 120 checks which parts of its cell-center band coincide with frequency bands where its cell-edge users will not be highly interfered with. That is, the checkered regions of the respective cell-center frequency band for each cell may be identified by the serving base station of the cell in question. On these blocks, the respective serving base station of the cell is then able to extend one or more of the selected cell-edge frequency bands on which it will schedule cell-edge user equipments without having them collide with cell-edge users from neighboring cells that will interfere with them.

According to some embodiments herein, each cell 110, 115, 120 in the cellular network 100 can, if needed, on average double the amount of resources allocated for cell-edge user equipments, while it is still avoided that the same frequency band is selected for cell-edge user equipments in different cells that interfere with each other.

Figure 5:
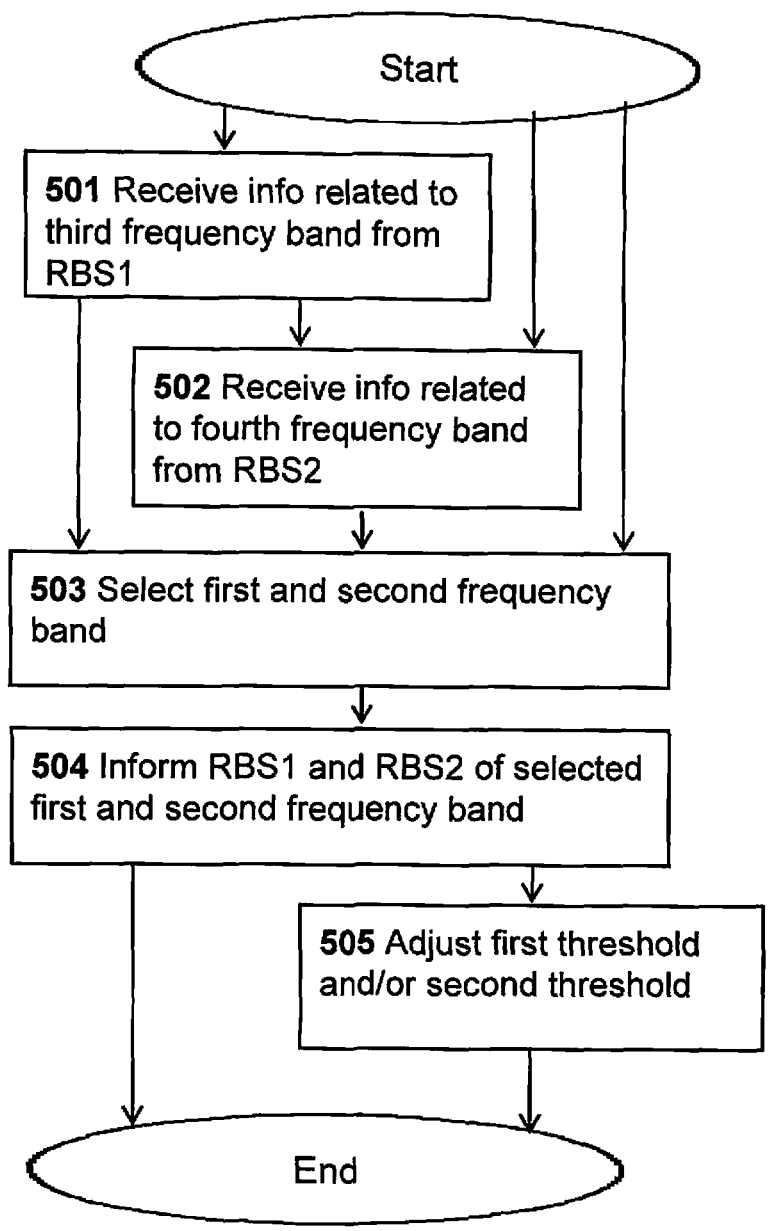
FIG. 5 is a flowchart depicting embodiments of a method in a base station.

Embodiments herein, relating to a method in the base station 105 for assisting in a coordination of frequency band selections for interfering uplink transmissions in the cellular network 100 will now be further elaborated and described with reference to the flowchart depicted in FIG. 5. These embodiments will be described in a more general way. As previously mentioned, the base station 105 serves the first cell 110 in the cellular network 100. As also previously mentioned, the cellular network 100 further comprises a second cell 115 and a third cell 120, which may or may not be served by the base station 105. The cellular network 100 and the base station 105 may be of any of the previously described types. The method comprises the following actions, which actions may be taken in any suitable order.

Action 501

This is an optional action, according to which the base station 105 receives, from the serving base station 125, 105 of the second cell 115, information related to a third frequency band 43. The third frequency band 43 may in some embodiments have been selected by the serving base station 125, 105 of the second cell 115 to be used in the second cell 115 for uplink transmissions from which uplink transmissions an estimated interference in the third cell 120 exceeds a third threshold.

Action 502

This is also an optional action, according to which the base station 105 receives, from the serving base station 130, 105 of the third cell 120, information related to a fourth frequency band 45. The fourth frequency band 45 may in some embodiments have been selected by the serving base station 130, 105 of the third cell 120 to be used in the third cell 120 for uplink transmissions from which uplink transmissions an estimated interference in the second cell 115 exceeds a fourth threshold.

Action 503

In this action, the base station 105 selects a first frequency band 41 and a second frequency band 42. The first frequency band 41 is to be used in the first cell 110 for uplink transmissions from which uplink transmissions an estimated interference in the second cell 115 exceeds a first threshold. The second frequency band 42 is to be used in the first cell 110 for uplink transmissions from which uplink transmissions an estimated interference in the third cell 120 exceeds a second threshold.

The total cell-edge band of the first cell 110 is hence the first frequency band 41, where the second cell 115 will be heavily interfered with, plus the second frequency band band 42, where the third cell 120 will be heavily interfered with.

Thanks to the first cell 110 selecting different frequency bands for different uplink transmissions, i.e. different cell-edge user equipments, depending on which cell the uplink transmission in question will interfere with, the coordination of frequency band selection is improved, since the second cell 115 will have to avoid only the first frequency band 41 where it will be interfered with, not the whole cell-edge band of the first cell. Similarly, the third cell 120 needs to avoid only the second frequency band 42 where it will be interfered with, not the whole cell-edge band of the first cell 110.

As such, thanks to embodiments herein, the second cell 115 and the third cell 120 will have a smaller respective frequency band that needs to be avoided by their respective serving base station when selecting frequency bands to be used for cell edge transmissions in these cells.

Embodiments herein therefore result in improved coordination of cell-edge bands between different cells due to smaller coordination bandwidth, the possibility to coordinate with one neighbor at a time, and the possibility to schedule more cell-edge users as the regions that are to be avoided for scheduling cell-edge users become smaller.

When the optional action 501 described above has been performed, the selecting 503 may be performed to make the second frequency band 42 comprise the third frequency band 43.

When the optional action 502 described above has been performed, the selecting 503 may be performed make the first frequency band 41 comprise the fourth frequency band 45.

This may be the case if the base station 105 is not the one to start the coordinating and/or when the coordinating starts in another cell that the first cell 110.

According to some embodiments, the selecting comprises selecting a bandwidth for the respective first frequency band 41 and/or second frequency band 42 based on a number of uplink transmissions, for which number of uplink transmissions the respective first frequency band 41 and/or the respective second frequency band 42 is to be used.

In some embodiments, A3 measurement reports sent from the user equipments to the serving base station 105 of the first cell 110, may be used by the base station 105 to determine which cells each of its user equipments will interfere with.

This may be done for example utilizing A3 measurement reports sent from the user equipments, similar to those used for handover, that determine the closest "n" neighbors to a certain user equipment. By properly determining the A3 threshold, the user equipments may only report the cells in which it will create high interference when this user equipment is scheduled for an uplink transmission. Based on this information it may be determined by the base station 105 which coordinating cells, e.g. the second cell 115 and the third cell 120, will be interfered with when it schedules certain cell-edge user equipments for an uplink transmission in the first cell 110.

According to some embodiments, a fifth frequency band 44, 46 has been selected by the serving base station 125, 105 of the second cell 115 to be used for uplink transmissions in the second cell 115 from which uplink transmissions an estimated interference in the first cell 110 exceeds a fifth threshold. In these embodiments, the fifth frequency band 45 has further been selected by the serving base station 130, 105 of the third cell 120 to be used for uplink transmissions in the third cell 120 from which uplink transmissions an estimated interference in the first cell 110 exceeds a sixth threshold.

In some of these embodiments, the selecting further comprises extending one of the first frequency band 41 and the second frequency band 42 to make it comprise one or more resource block which have been released from the fifth frequency band 44, 46.

In other of these embodiments, the selecting is performed to release one or more resource block from one of the first frequency band 41 and the second frequency band 42, which one or more resource block is to become comprised in the fifth frequency band 44, 46.

According to some embodiments herein, the selecting further comprises selecting a sixth frequency band, which sixth frequency band is to be used for uplink transmissions in the first cell 110 from which uplink transmissions the estimated interference in the second cell 115 exceeds the first threshold and from which transmissions the estimated interference in the third cell 120 exceeds the second threshold.

In the above, embodiments herein have been illustrated assuming that a user equipment will cause interference to mainly one cell. Although this holds for the majority of cases, some user equipments may create high interference to two or more cells at the same time, for example user equipments being located close to the border of three cells. Such a case may be inherently handled by some embodiments herein, since the frequency band selected for use for uplink transmissions from user equipments that are expected to interfere with more than one coordinating cell, will not be available for any other coordinating cell to schedule its cell-edge user equipments on.

According to some embodiments, a portion of the first frequency band 41 overlaps a portion of the second frequency band 42. The sixth frequency band may then be selected to comprise the overlapping portion.

This may be advantageous for example if there are several user equipments from which uplink transmissions are expected to create high interference to more than one other coordinating cell at the same time.

Action 504

In this action, the base station 105 informs a serving base station 125, 105 of the second cell 115 and a serving base station 130, 105 of the third cell 120 about the performed selection 501. Thereby the base station 105 assists the serving base station 125, 105 of the second cell 115 and the serving base station 130, 105 of the third cell 120 in coordinating their respective frequency band selection with that of the base station 105.

If the cells belong to the same site, a certain common unit per site may be responsible for transferring this information.

Otherwise, that is if the serving base station 125 for the second cell 115 and/or the serving base 130 station for the third cell 120 is not the same base station as the base station 105 that serves the first cell 110, X2 messages, e.g. a high interference indicator may be utilized to inform the serving base station 125 of the second cell 115 and/or the serving base station 130 of the third cell 120 of the selected first and second cell-edge bands of cell 1 selected in action 503.

Action 505

This is an optional action, according to which the base station 105 adjusts at least one of the first threshold and the third threshold based on a number of uplink transmissions, for which number of uplink transmissions the respective first frequency band 41 and/or the respective second frequency band 42 is to be used.

The first, second, third and/or fourth thresholds, as well as the further thresholds referred to herein, may be dynamically adjusted or predetermined.

The first, second, third and/or fourth thresholds, as well as the further thresholds referred to herein, may be the same or different. For instance, the thresholds can be modified in such a way to maintain a specific number of cell-edge user equipments (or alternatively, a specific number of resources that are needed to be allocated to cell-edge user equipments), thus leading to decreasing the need of continuously or excessively adjusting the size of the band allocated to cell-edge user equipments.

Embodiments herein may be implemented in a 3GPP-compatible fashion as the high interference indicator (HII) utilized to signal a cell-edge band region may be signaled to specific neighboring cell(s). As such, different HII may be sent to different cells based on where they are expected to experience interference from the same interfering cell.

It is also possible to implement the proposed method in a proprietary fashion.

Some advantages of embodiments herein include the possibility to schedule more cell-edge users per cell compared to prior the described art approach, without increasing the interference experienced by these cell-edge users, and easier coordination of cell-edge band between different cells due to a smaller needed coordination bandwidth and the possibility to coordinate with one coordinating cell at a time.

In some embodiments, the coordinating cells are neighbor cells.

In some embodiments the coordination is performed dynamically in the cellular network 100.

It is to be understood that the coordination may involve more than three coordinating cells.

Figure 6:
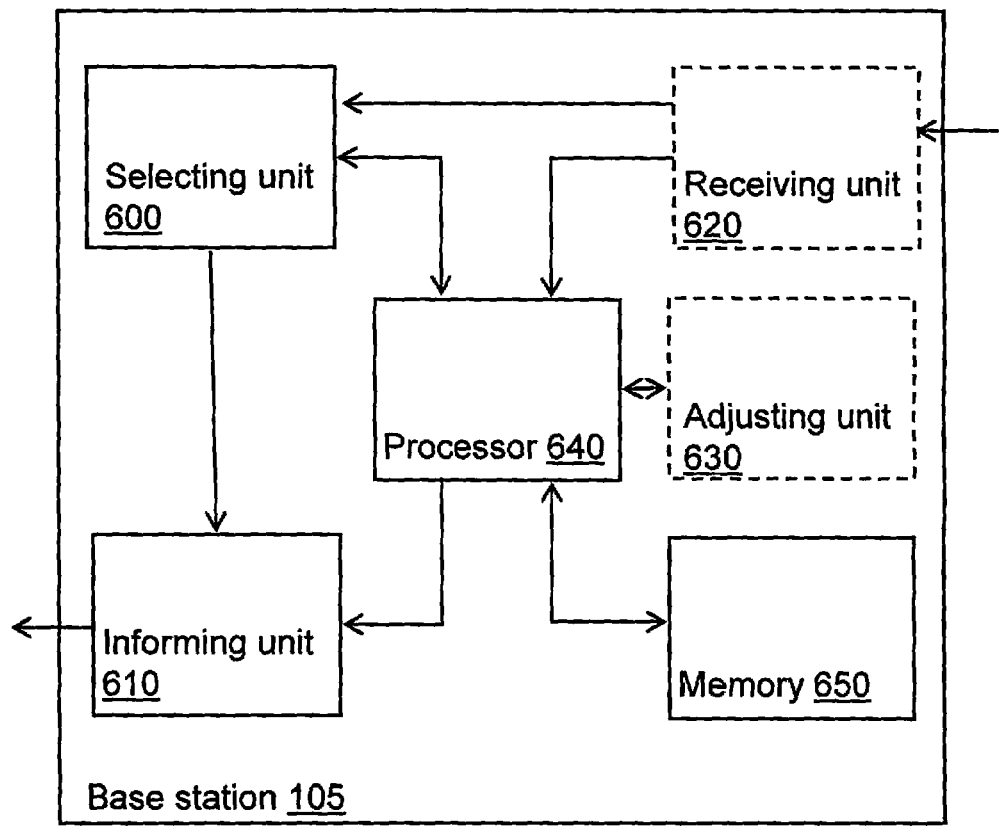
FIG. 6 is a schematic block diagram illustrating embodiments of a base station.

To perform the actions above for assisting in a coordination of frequency band selections for interfering uplink transmissions in the cellular network 100 the base station 105 comprises an arrangement schematically depicted in FIG. 6. As mentioned above, the base station 105 serves a first cell 110 in the cellular network 100. As also previously mentioned, the cellular network 100 further comprises a second cell 115 and a third cell 120.

The term "configured to" used herein may also be referred to as "arranged to".

The base station 105 comprises a selecting unit 600. The selecting unit 600 is configured to select a first frequency band 41 and a second frequency band 42. The first frequency band 41 is to be used in the first cell 110 for uplink transmissions from which uplink transmissions an estimated interference in the second cell 115 exceeds a first threshold. The second frequency band 42 is to be used in the first cell 110 for uplink transmissions from which uplink transmissions an estimated interference in the third cell 120 exceeds a second threshold.

According to some embodiments herein, the selecting unit 600 is further configured to perform the selecting to make the second frequency band 42 comprise the third frequency band 43. The third frequency band 43 has been selected by the serving base station 125, 105 of the second cell 115 to be used in the second cell 115 for uplink transmissions from which uplink transmissions an estimated interference in the third cell 120 exceeds a third threshold.

According to some embodiments herein, the selecting unit 600 is further configured to perform the selecting to make the first frequency band 41 comprise the fourth frequency band 44. The fourth frequency band 44 has been selected by the serving base station 130, 105 of the third cell 120 to be used in the third cell 120 for uplink transmissions from which uplink transmissions an estimated interference in the second cell 115 exceeds a fourth threshold.

According to some embodiments herein, the selecting unit 600 is further configured to select a bandwidth for the respective first frequency band 41 and/or second frequency band 42 based on a number of uplink transmissions, for which number of uplink transmissions the respective first frequency band 41 and/or the respective second frequency band 42 is to be used.

According to some embodiments herein, a fifth frequency band 44, 46 has been selected by the serving base station 125, 105 of the second cell 115 to be used for uplink transmissions in the second cell 115 from which uplink transmissions an estimated interference in the first cell 110 exceeds a fifth threshold, which fifth frequency band 44, 46 has further been selected by the serving base station 130, 105 of the third cell 120 to be used for uplink transmissions in the third cell 120 from which uplink transmissions an estimated interference in the first cell 110 exceeds a sixth threshold.

In some such embodiments, the selecting unit 600 may be further configured to perform the selection to extend one of the first frequency band 41 and the second frequency band 42 to make it comprise one or more resource block which has been released from the fifth frequency band 44, 46.

In other such embodiments, the selecting unit 600 may be configured to perform the selection to release one or more resource block from one of the first frequency band 41 and the second frequency band 42, which one or more resource block is to become comprised in the fifth frequency band 44, 46.

In some embodiments herein, the selecting unit 600 is further configured to select a sixth frequency band, which sixth frequency band is to be used for uplink transmissions in the first cell 110 from which uplink transmissions the estimated interference in the second cell 115 exceeds the first threshold and from which transmissions the estimated interference in the third cell 120 exceeds the second threshold.

According to some embodiments herein, a portion of the first frequency band 41 overlaps a portion of the second frequency band 42, and the selecting unit 600 is further configured to select the sixth frequency band to comprise the overlapping portion.

The base station 105 further comprises an informing unit 610. The informing unit 610 is configured to inform a serving base station 125, 105 of the second cell 115 and a serving base station 130, 105 of the third cell 120 about the performed selection 501. Thereby the base station 105 assists the serving base station 125, 105 of the second cell 115 and the serving base station 130, 105 of the third cell 120 in coordinating their respective frequency band selection with that of the base station 105.

In some embodiments, when the serving base station of the second cell 115 and/or the serving base station of the third cell 120 are the same base station as the serving base station 105 of the first cell 110, the informing unit may be certain common unit arranged therefore in the base station 105.

In other embodiments, when at least one of the second cell 115 and the third cell 120 is served by another base station than the base station 105, then the informing unit 610 may be a transmitter or sending unit configured to perform the informing over wireline or wireless, e.g. using the X2 interface.

The base station 105 may further comprise a receiving unit 620. The receiving unit 620 may be configured to receive, from the serving base station 125, 105 of the second cell 115, information related to a third frequency band 43. The third frequency band 43 has been selected by the serving base station 125, 105 of the second cell 115 to be used in the second cell 115 for uplink transmissions from which uplink transmissions an estimated interference in the third cell 120 exceeds a third threshold.

The receiving unit 620 may further be configured to receive, from the serving base station 130, 105 of the third cell 120, information related to a fourth frequency band 44 which fourth frequency band 44 has been selected by the serving base station 130, 105 of the third cell 120 to be used in the third cell 120 for uplink transmissions from which uplink transmissions an estimated interference in the second cell 115 exceeds a fourth threshold.

According to some embodiments herein, the base station 105 further comprises an adjusting unit 630 configured to adjust at least one of the first threshold and the third threshold based on a number of uplink transmissions, for which number of uplink transmissions the respective first frequency band 41 and/or the respective second frequency band 42 is to be used.

The embodiments of the base station 105 for assisting in a coordination of frequency band selections for interfering uplink transmissions in the cellular network 100 may be implemented through one or more processors, such as a processor 640 in the base station 105 depicted in FIG. 6, together with computer program code for performing the actions of embodiments herein.

The program code mentioned above may also be provided as a computer program product, for instance in the form of a data carrier carrying computer program code for performing the embodiments herein when being loaded into the base station 105.

One such carrier may be in the form of a CD ROM disc. It is however feasible with other data carriers such as a memory stick. The computer program code may furthermore be provided as pure program code on a server and downloaded to the base station 105 e.g. remotely.

The base station 105 may further comprise a memory 650 comprising one or more memory units. The memory 650 is arranged to be used to store data such as for example the selected frequency bands. It may further be arranged to store applications to perform the actions of the embodiments herein when being executed in the base station 105.

According to some embodiments herein, each cell in a set of cells which are to coordinate their frequency band selections for interfering uplink transmissions determines a cell-edge band per neighbor cell, i.e. the region where a cell will schedule user equipments that risk causing uplink interference to the user equipments of that specific neighbor cell, and informs each of its neighbor cells of it. This may performed separately for every neighbor or coordinating cell that a cell is coordinating with.

This implicitly means that each cell may also know where its neighbor coordinating cells will interfere with it. This information may be used to make the inter-cell interference coordination possible on a cell-by-cell basis according to embodiments herein, and enable the scheduling of more cell-edge users than possible with the conventional SFR approach, while still avoiding co-scheduling cell-edge users that will interfere with each other, i.e. maintaining a reuse-3-like characteristic for the frequency band selections for frequency bands to be used for cell-edge user equipments.

Embodiments herein may, as previously mentioned, make use of information related to which cell a certain user equipment will interfere with when it is scheduled for an uplink transmission. Such information may be obtained for example through a proper configuration of an A3 event and used according to some embodiments herein to determine if uplink transmissions from a particular user equipment are expected to interfere harmfully, or over a certain threshold, with a particular cell.

In short, according to embodiments herein interference coordination is performed from a per-interfered-neighbor perspective, or per-interfered-coordinating cell perspective.

It may be determined which cell-edge user equipments from two coordinating cells do not interfere with each other, and these cell edge user equipments may according to embodiments herein then be scheduled on the same resources as cell-center user equipments of a third coordinating cell.

Embodiments herein make it possible to schedule more cell-edge users per cell compared to prior art methods, while still avoiding co-scheduling cell-edge users that interfere with each other. For a person skilled in the art, it is straightforward to notice that the coordination complexity decreases by being able to coordinate with one neighbor at a time, and over a smaller band.

Embodiments herein relate to wireless systems in general, and to systems employing frequency reuse and management for uplink communication in particular.

The embodiments are not limited to the above-described embodiments. Various alternatives, modifications and equivalents may be used.

When using the word "comprise" or "comprising" it shall be interpreted as non-limiting, i.e. meaning "consist at least of".

The embodiments herein are not limited to the above described embodiments. Various alternatives, modifications and equivalents may be used. Therefore, the above embodiments should not be taken as limiting the scope of the invention, which is defined by the appending claims.

The invention claimed is:

1. A method in a first base station for assisting in a coordination of frequency band selections for interfering uplink transmissions in a cellular network, wherein the first base station serves a first cell in the cellular network, wherein the cellular network further comprises a second cell and a third cell neighboring the first cell, the method comprising:
   selecting from a cell-edge band allocated to the first cell, a first frequency band and a second frequency band, wherein the first frequency band is to be used in the first cell for uplink transmissions from users expected to interfere with users in the second cell at a level exceeding a first threshold, and wherein the second frequency band is to be used in the first cell for uplink transmissions from users expected to interfere with users in the third cell at a level exceeding a second threshold;
   informing a serving base station of the second cell and a serving base station of the third cell about the frequency-band selections, thereby assisting the serving base station of the second cell and the serving base station of the third cell to select respective frequency bands for use by users in the second and third cells that minimize interference among the cells;
   receiving from the serving base station of the third cell, information related to a fourth frequency band, wherein the fourth frequency band has been selected by the serving base station of the third cell to be used in the third cell for uplink transmissions from users expected to interfere with users in the second cell at a level exceeding a fourth threshold; and
   the first base station extending the first frequency band to include the fourth frequency band;
   wherein a fifth frequency band has been selected by the serving base station of the second cell to be used for uplink transmissions in the second cell from users expected to interfere with users in the first cell at a level exceeding a fifth threshold;
   wherein the fifth frequency band has further been selected by the serving base station of the third cell to be used for uplink transmissions in the third cell from users expected to interfere with users in the first cell at a level exceeding a sixth threshold; and
   wherein the selecting further comprises the first base station extending one of the first frequency band and the second frequency band to include one or more resource blocks which have been released from the fifth frequency band, or wherein the selecting further comprises the first base station releasing one or more resource blocks from one of the first frequency band and the second frequency band, wherein the one or more resource blocks is to be included in the fifth frequency band.

2. The method according to claim 1, further comprising:
   receiving from the serving base station of the second cell, information related to a third frequency band, wherein the third frequency band has been selected by the serving base station of the second cell to be used in the second cell for uplink transmissions from users expected to interfere with users in the third cell at a level exceeding a third threshold; and
   the first base station extending the second frequency band to include the third frequency band.

3. The method according to claim 1, wherein the selecting comprises selecting a bandwidth for the respective first frequency band or second frequency band based on a number of uplink transmissions, for which number of uplink transmissions the respective first frequency band or the respective second frequency band is to be used.

4. The method according to claim 1, wherein the selecting further comprises the first base station selecting a sixth frequency band, wherein the sixth frequency band is to be used for uplink transmissions in the first cell from users expected to interfere with users in the second cell at a level exceeding the first threshold, wherein a portion of the first frequency band overlaps a portion of the second frequency band, and wherein the sixth frequency band is selected to include the overlapping portion.

5. A first base station for assisting in a coordination of frequency band selections for interfering uplink transmissions in a cellular network, wherein the first base station serves a first cell in the cellular network, wherein the cellular network further comprises a second cell and a third cell neighboring the first cell, the first base station comprising:
- a selecting unit, configured to select a first frequency band and a second frequency band, wherein the first frequency band is to be used in the first cell for uplink transmissions from users expected to interfere with users in the second cell at a level exceeding a first threshold, and wherein the second frequency band is to be used in the first cell for uplink transmissions from users expected to interfere with users in the third cell at a level exceeding a second threshold;
- an informing unit configured to inform a serving base station of the second cell and a serving base station of the third cell about the frequency-band selections, thereby assisting the serving base station (125, 105) of the second cell and the serving base station of the third cell to select respective frequency bands for use by users in the second and third cells that minimize interference among the cells; and
- a receiving unit configured to receive, from the serving base station of the third cell, information related to a fourth frequency band, wherein the fourth frequency band has been selected by the serving base station of the third cell to be used in the third cell for uplink transmissions from users expected to interfere with users in the second cell at a level exceeding a fourth threshold, and wherein the selecting unit is further configured to extend the first frequency band to include the fourth frequency band;
- wherein a fifth frequency band has been selected by the serving base station of the second cell to be used for uplink transmissions in the second cell from users expected to interfere with users in the first cell at a level exceeding a fifth threshold;
- wherein the fifth frequency band has further been selected by the serving base station of the third cell to be used for uplink transmissions in the third cell from users expected to interfere with users in the first cell at a level exceeding a sixth threshold; and
- wherein the selecting unit is further configured to extend one of the first frequency band and the second frequency band to include one or more resource blocks which have been released from the fifth frequency band, or the selecting unit is further configured to release one or more resource blocks from one of the first frequency band and the second frequency band, which one or more resource blocks is to be included in the fifth frequency band.

6. The first base station according to claim 5, further comprising a receiving unit, configured to receive, from the serving base station of the second cell, information related to a third frequency band, wherein the third frequency band has been selected by the serving base station of the second cell to be used in the second cell for uplink transmissions from users expected to interfere with users in the third cell at a level exceeding a third threshold, and wherein the selecting unit is further configured to extend the second frequency band to include the third frequency band.

7. The first base station according to claim 5, wherein the selecting unit is further configured to select a bandwidth for the respective first frequency band or second frequency band based on a number of uplink transmissions, for which number of uplink transmissions the respective first frequency band or the respective second frequency band is to be used.

8. The first base station according to claim 5, wherein the selecting unit is further configured to select a sixth frequency band, wherein the sixth frequency band is to be used for uplink transmissions in the first cell from users expected to interfere with users in the second cell at a level exceeding the first threshold, wherein a portion of the first frequency band overlaps a portion of the second frequency band, and wherein the sixth frequency band is selected to include the overlapping portion.

* * * * *

UNITED STATES PATENT AND TRADEMARK OFFICE
CERTIFICATE OF CORRECTION

PATENT NO. : 9,326,151 B2
APPLICATION NO. : 14/232386
DATED : April 26, 2016
INVENTOR(S) : Manssour It is certified that error appears in the above-identified patent and that said Letters Patent is hereby corrected as shown below:

In the specification

In Column 4, Line 55, delete "third cell 115" and insert -- third cell 120 --, therefor.

In Column 5, Line 7, delete "a SFR" and insert -- an SFR --, therefor.

In Column 6, Line 30, delete "second cell 120." and insert -- second cell 115. --, therefor.

In Column 8, Lines 8-9, delete "third cell 115." and insert -- third cell 120. --, therefor.

In Column 8, Line 15, delete "third cell 115." and insert -- third cell 120. --, therefor.

In Column 11, Line 34, delete "fifth frequency band 45" and insert -- fifth frequency band 44, 46 --, therefor.

In the claims

In Column 17, Line 26, in Claim 5, delete "station (125, 105)" and insert -- station --, therefor.

Signed and Sealed this
Twelfth Day of July, 2016

Michelle K. Lee
*Director of the United States Patent and Trademark Office*